(12) United States Patent
Lerenc

(10) Patent No.: US 9,319,843 B2
(45) Date of Patent: Apr. 19, 2016

(54) ADAPTIVE ACCELERATION-BASED REMINDERS

(71) Applicant: Vedran Lerenc, Schoenau (DE)

(72) Inventor: Vedran Lerenc, Schoenau (DE)

(73) Assignee: SAP SE, Walldorf (DE)

( * ) Notice: Subject to any disclaimer, the term of this patent is extended or adjusted under 35 U.S.C. 154(b) by 202 days.

(21) Appl. No.: 13/781,275

(22) Filed: Feb. 28, 2013

(65) Prior Publication Data

US 2014/0243021 A1    Aug. 28, 2014

(51) Int. Cl.
*H04W 4/02*    (2009.01)

(52) U.S. Cl.
CPC ..................................... *H04W 4/027* (2013.01)

(58) Field of Classification Search
CPC ............ G06Q 10/109; G06Q 10/1095; G06Q 10/063114; G06Q 10/1093; H04W 4/027; H04W 48/04

USPC ................... 705/7.19; 340/539.13; 455/456.1
See application file for complete search history.

(56) References Cited

U.S. PATENT DOCUMENTS

| | | | |
|---|---|---|---|
| 2007/0057779 A1* | 3/2007 | Battista et al. | 340/425.5 |
| 2007/0241885 A1* | 10/2007 | Clipsham | 340/539.13 |
| 2009/0036148 A1* | 2/2009 | Yach | 455/457 |
| 2009/0192861 A1* | 7/2009 | Suzuki et al. | 705/8 |
| 2010/0198608 A1* | 8/2010 | Kaboff et al. | 705/2 |
| 2011/0130958 A1* | 6/2011 | Stahl et al. | 701/201 |
| 2011/0167357 A1* | 7/2011 | Benjamin et al. | 715/753 |
| 2011/0307287 A1* | 12/2011 | Conley | 705/7.19 |

* cited by examiner

*Primary Examiner* — Vladimir Magloire
*Assistant Examiner* — Ernest Tacsik
(74) *Attorney, Agent, or Firm* — Kenyon & Kenyon LLP

(57) ABSTRACT

A database may be searched for prior meetings matching the proposed meeting. Each prior meeting may include attendees of each prior meeting and travel time of each attendee to the each prior meeting. Upon identifying one or more matched prior meetings, a notification for an attendee of the proposed meeting based on travel times of the attendee to the one or more matched prior meetings may be generated.

16 Claims, 3 Drawing Sheets

ADAPTIVE ACCELERATION-BASED REMINDERS

BACKGROUND INFORMATION

Current calendar applications for scheduling meetings often provide reminders before a scheduled meeting to remind a user of the occurrence of a pending meeting. Most reminders are provided to the user at some default time, such as a specific number of minutes before the meeting is to begin. While these reminders may suffice for users at a fixed locale, such as at their office, and have sufficient time to travel to the location of the meeting, it is problematic particularly for users on the go or who may be present at a location that is far from the meeting location. For these users, receiving a meeting reminder at a fixed time period before the start of a meeting may not be helpful. Current implementations of meeting reminders in calendar applications do not take into consideration a user's current location and necessary travel time to travel to the meeting location.

DETAILED DESCRIPTION

The subject matter will now be described in detail for specific preferred embodiments, it being understood that these embodiments are intended only as illustrative examples and are not to be limited thereto.

Embodiments may be directed to optimally generate meeting notifications. In an embodiment, prior to a meeting, upon detecting a mobile device is in motion, a start time of the detected motion may be stored. Upon determining the mobile device is no longer in motion, an end time of the detected motion may be stored. The start time and the end time may be transmitted to a backend server. The backend server may store an association between the mobile device's user and details of the meeting including the start time and the end time. In an embodiment, the mobile device may be detected to be in motion if the motion is above a first predetermined threshold and the mobile device may be determined to be no longer in motion if the motion is below a second predetermined threshold.

In an embodiment, a proposed meeting may be received. A database may be searched for prior meetings matching the proposed meeting. Each prior meeting may include attendees of each prior meeting and travel time of each attendee to each prior meeting. Upon identifying one or more matched prior meetings, a notification for an attendee of the proposed meeting based on travel times of the attendee to the one or more matched prior meetings may be generated. In an embodiment, the proposed meeting may match a prior meeting if one or more attendees of the prior meeting are an attendee of the proposed meeting. The notification may be generated at a particular time period prior to a start time of the proposed meeting and the time period may be set to an average of the travel times of the attendee to the one or more matched prior meetings. In an embodiment, the notification generation may be based on a meeting preparation time specified by the attendee.

In an embodiment, prior to a meeting, upon detecting a mobile device is in motion, a start time of the detected motion may be stored. Upon determining the mobile device is no longer in motion, an end time of the detected motion may be stored. A travel time of the mobile device's user prior to the meeting may be calculated based on the start time and the end time. The mobile device's user may be associated with the details of the meeting including the travel time. The details of the meeting may be stored. In response to receiving a new proposed meeting request on the mobile device, a search may be performed for prior meetings matching the proposed meeting. Each prior meeting may include attendees of the each prior meeting and travel time of each attendee to the each prior meeting. Upon identifying one or more matched prior meetings, a notification may be generated for an attendee of the proposed meeting based on travel times of the attendee to the one or more matched prior meetings.

Figure 1:
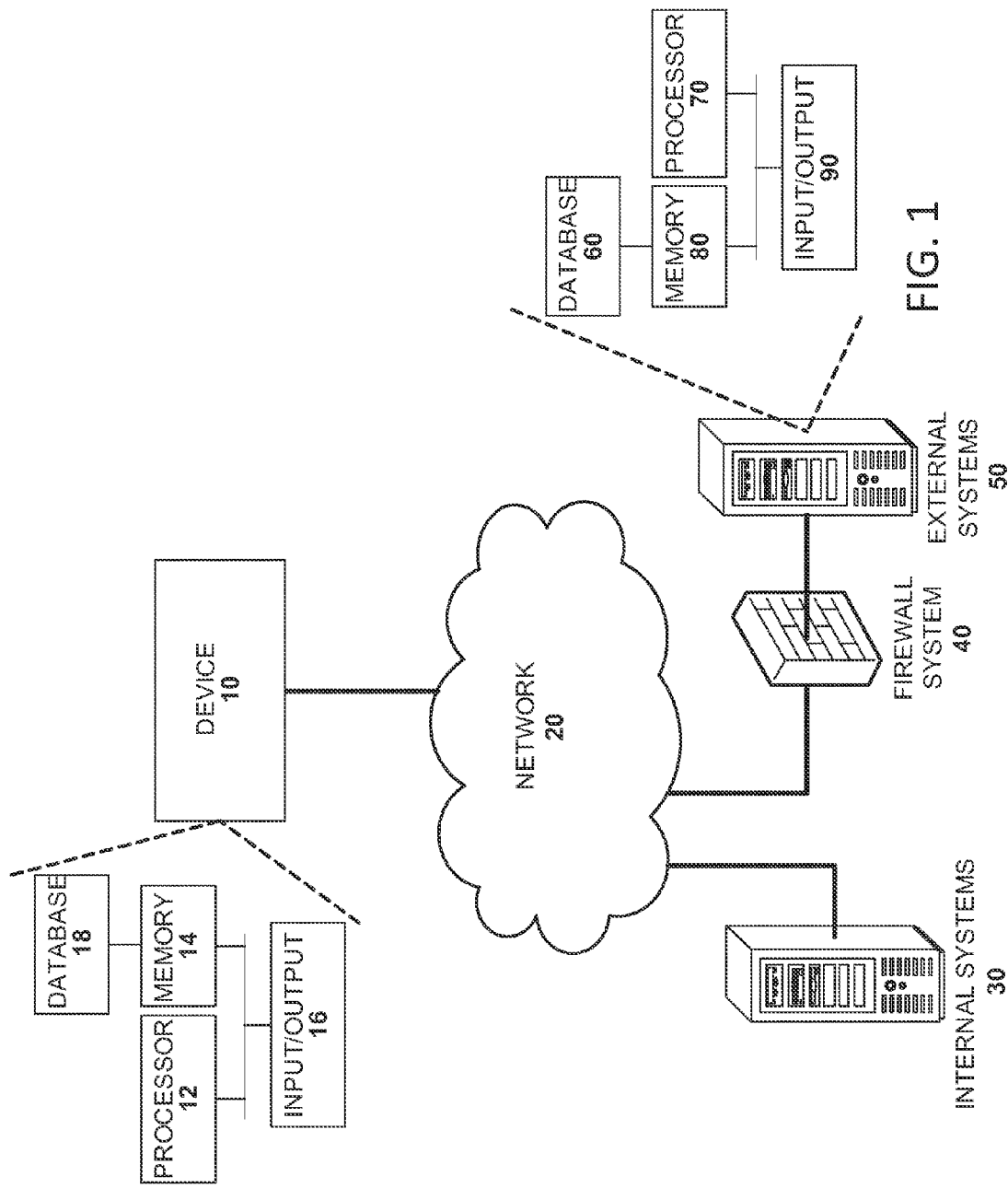
FIG. 1 is a diagram of a system in which a mobile device connects to a backend system to determine the location and movement of the mobile device according to an embodiment.

FIG. 1 illustrates an architecture of the system for identifying the location of a mobile device and linking to joint movement of other mobile devices. In an embodiment, device 10 may be a hand-held device, personal digital assistant (PDA), television set-top Internet appliance, mobile telephone, smart phone, tablet, etc., or as a combination of one or more thereof, or other comparable device. A mobile application may be executed on device 10. This mobile application may be displayed in a user interface that is displayed on a screen of the device 10.

Determining a location of the device 10 may be made by connecting the device 10 to backend computer systems or networks to identify the geographic location of the device 10. Identification of the geographic location of the device may be made through location based services using GPS technology, where, for example, device 10 may connect directly to a satellite, with the geographic position and other location data being transmitted back to device 10 which transmits this data to the backend system, or alternately, the backend system itself may connect to a satellite. Upon identification of a single location of device 10, this location may be stored in a memory 80. Different determined locations for device 10 may be used to generate a movement profile of device 10 in the mobile application. The movement profile may communicate with the backend system to provide information as to the movement of the phone, in particularly past movement of device 10. GPS location is also used to log the location of the meeting, when the device 10 eventually arrives at the meeting.

Determined locations of device 10, including geographic data, as well as any acceleration related data, may be stored in one or more databases in the backend system. When the data is retrieved, the location data may be translated to a data protocol by a gateway that may be part of a firewall system 40. Device 10 may connect to a gateway through a platform that provides a secured connection for connectivity.

The backend systems storing possible location data may be separated into internal backend systems and external backend systems. Device 10 may connect to internal backend systems 30 through a network 20. Device 10 may also connect to external backend systems 50 through the network 20 and a firewall system 40. In an embodiment, network 20 may be implemented as a cellular network, WLAN network, short range communication network or a combination of different wired and/or wireless networks. The firewall system 40 may include a gateway and a platform to translate the location data to a data protocol and provide a secured connection.

The internal backend systems 30 may include a server and may provide location based data including the geographic location data. The external backend systems 50 may include a server, and may also contain location based data tracking the location of device 10. The application on device 10 may interact with these external systems to obtain updates on the location of device 10, through a firewall system 40 separating the internal systems from the external systems. The gateway and platform provided by the firewall system 40 allow for a secure transmission of the GPS location data to device 10.

Device 10 may include a processor 12, a memory 14, and input/output interface 16, and a database 18. Database 18 may include any type of data storage adapted to searching and retrieval. In an example embodiment, determined location data may be stored directly on device 10 in database 18 or memory 14, which may have a designated storage capacity. When the mobile application accesses the locally saved location data, processer 12 may retrieve the data from memory 14. In an embodiment, memory 14 may contain different components for retrieving, presenting, changing, and saving the local data. Memory 14 may include a variety of memory devices, for example, Dynamic Random Access Memory (DRAM), Static RAM (SRAM), flash memory, cache memory, and other memory devices. In an embodiment, memory 14 may be a memory device that may be easily incorporated in a mobile device.

In an embodiment, device 10 may also include accelerometers built into the device. These accelerometers may be used to track the acceleration of the device 10, which may be stored with the other location data included the determined geographic location. These accelerometers may be used to determine whether the user carrying device 10 is in motion or is stagnant. If the accelerometers have determined no motion, the user may not be moving, including, for example, sitting, lying down, or sleeping, or the user may simply be away from their device 10. If motion is detected by the accelerometers, backend system 50 may take this motion into account (including the direction and magnitude of the acceleration and whether it is in the direction of the meeting location) in determining when to provide a notification reminder on device 10.

The backend systems 30 and 50 may both contain a processor 70, memory 80, a database 60, and an input/output interface 90, all of which may be interconnected via a system bus. In various embodiments, both of the systems 30 and 50 may have an architecture with modular hardware or software systems that include additional systems communicating through one or more networks. The modular design may enable a business to add, exchange, and upgrade systems, including using systems from different vendors in some embodiments. The architecture may include embodiments that have different configurations than the example embodiment depicted in FIG. 1.

In an embodiment, memory 80 may contain different components for retrieving, presenting, changing, and saving the current location data and the acceleration data provided by the accelerometers. Memory 80 may include a variety of memory devices, for example, Dynamic Random Access Memory (DRAM), Static RAM (SRAM), flash memory, cache memory, and other memory devices. Additionally, for example, memory 80 and processor 70 may be distributed across several different computers that collectively comprise a system.

Database 60 may include any type of data storage adapted to searching and retrieval. The databases of internal backend systems 30 and external backend system 50 may store location data for retrieval by the application executed on device 10.

Processor 70 may perform computation and control functions of a system and comprises a suitable central processing unit. Processor 70 may comprise a single integrated circuit, such as a microprocessor, or may comprise any suitable number of integrated circuit devices or circuit boards working in cooperation to accomplish the functions of a processor. Processor 70 may execute computer programs, such as object-oriented computer programs, within memory 80.

The mobile application configured on device 10 may be configured to check the accelerometers integrated in the mobile phone and apply a filter to detect non-motion, i.e. the user is sitting, lying down, etc., from motion. In an embodiment a very simple filter may be implemented directly into device 10. In an embodiment, the filter may be any type of linear filter, it being understood that the discussion herein is not restrictive as to the type of filter. In an example embodiment, the filter in device 10 may be adapted to interpret all accelerometer events below a certain noise threshold as non-motion. The noise threshold may be set in consideration of the precision and accuracy of the accelerometers in device 10. In an embodiment, if movement is detected for longer than a certain designated period (e.g. 30 seconds), the mobile application may interpret this movement as motion. If the movement is no longer detected for a certain designated period (e.g. 30 seconds) this may on the other hand, be interpreted as non-motion. The mobile application may be configured to protocol when the state changes, i.e. when the device 10 moves from motion to non-motion. In an embodiment, the mobile application may protocol the timestamp at which mobile device 10 either starts to show motion or ceases to show motion. In an embodiment, the last prolonged period of motion before a meeting may be interpreted as the motion required to reach from the current location to the meeting location.

Figure 2:
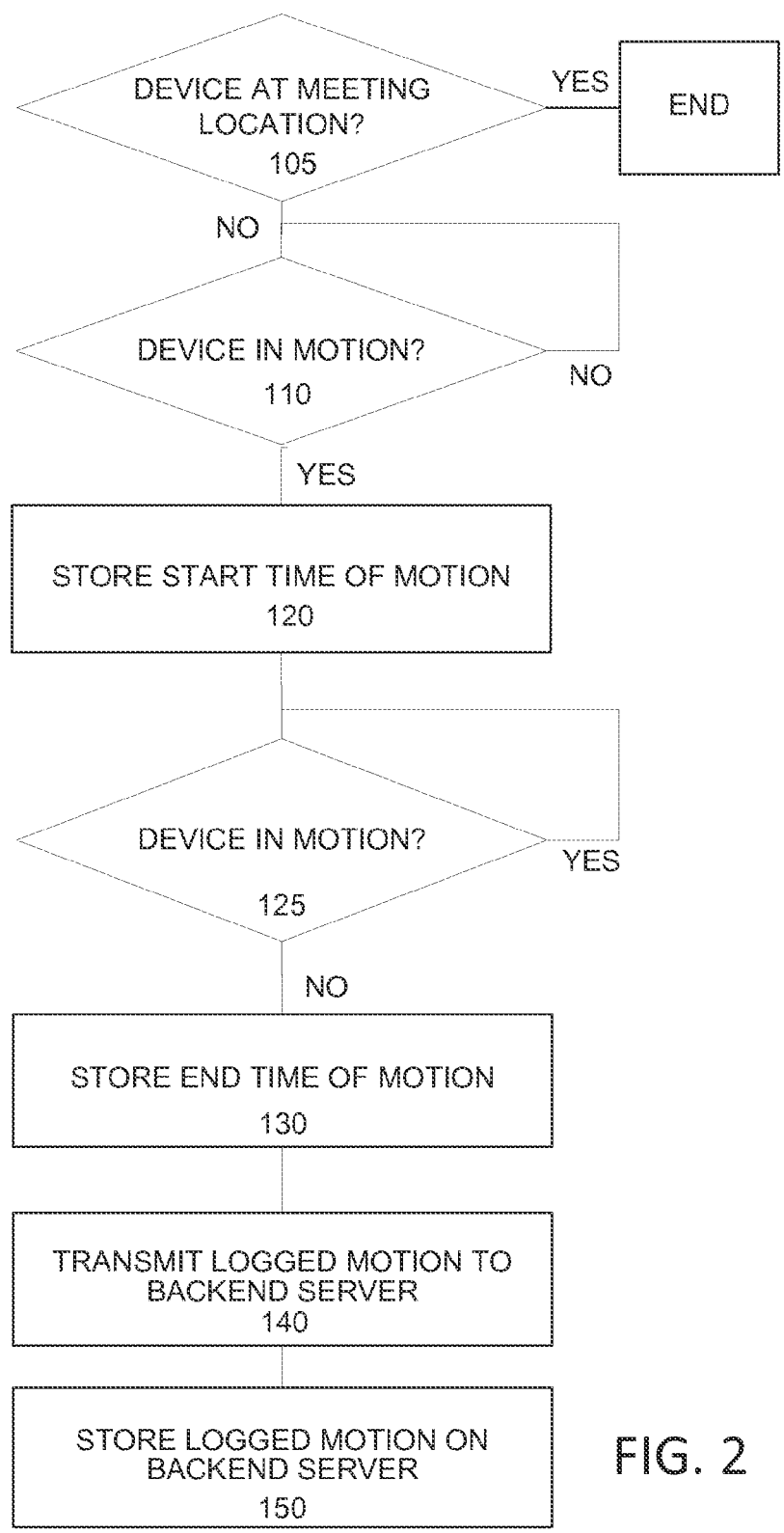
FIG. 2 is a diagram of the process of storing motion details of a mobile device prior to a meeting according to an embodiment.

FIG. 2 illustrates a diagram of the process of storing motion details of a mobile device prior to a meeting according to an embodiment. Prior to a meeting, in step 105, a check may be performed to determine if the mobile device is at the meeting location based on GPS/WiFi services. In an embodiment, the timing of the check at step 105 may be pre-configured. For example, the initial check 105 may be pre-configured to be performed 15 minutes before the start time of the meeting. If the device is not at the meeting location, in step 110, a check may be performed to determine if the mobile device 10 is in motion. In an embodiment, the check may be performed by the mobile device 10 utilizing integrated accelerometers. If the device 10 is not in motion, the process may wait for a predetermined amount of time and perform the check 110 again. Once it is determined that the device is in motion 110, the time at which motion was detected may be stored 120. In step 125, a check may be performed to determine if the mobile device 10 is no longer motion. If the device 10 is still in motion, the process may wait for a predetermined amount of time and perform the check 125 again. Once it is determined that the device is no longer in motion 125, the time at which no motion was detected may be stored 130. The ascertained start time and end time of the motion may be transmitted by the mobile device to a backend server 140. The backend server may store the start time and the end time of the motion in a database for future use. In an embodiment, the backend server may associate the start time and end time of the motion with the owner/user of the mobile device and/or details of the corresponding meeting such as, for example, the title of the meeting, the location of the meeting, the start/end time of the meeting, and the attendees of the meeting. The meeting details may be transmitted to the backend server, by a meeting scheduling application, in response to the creation and/or modification of the meeting.

In an alternate embodiment, at step 125, instead of detecting the lack of motion, the mobile device may utilize GPS and/or WiFi to determine whether the mobile device is essentially at the location of the meeting. If so, the mobile device may store the arrival time at the meeting location at step 130. The ascertained start time of the motion and the arrival time at the meeting location may be transmitted by the mobile device to a backend server 140. The backend server may store start time of the motion and the arrival time at the meeting location in a database for future use. In an embodiment, the backend server may associate the time information with details of the corresponding meeting as discussed above.

Figure 3:
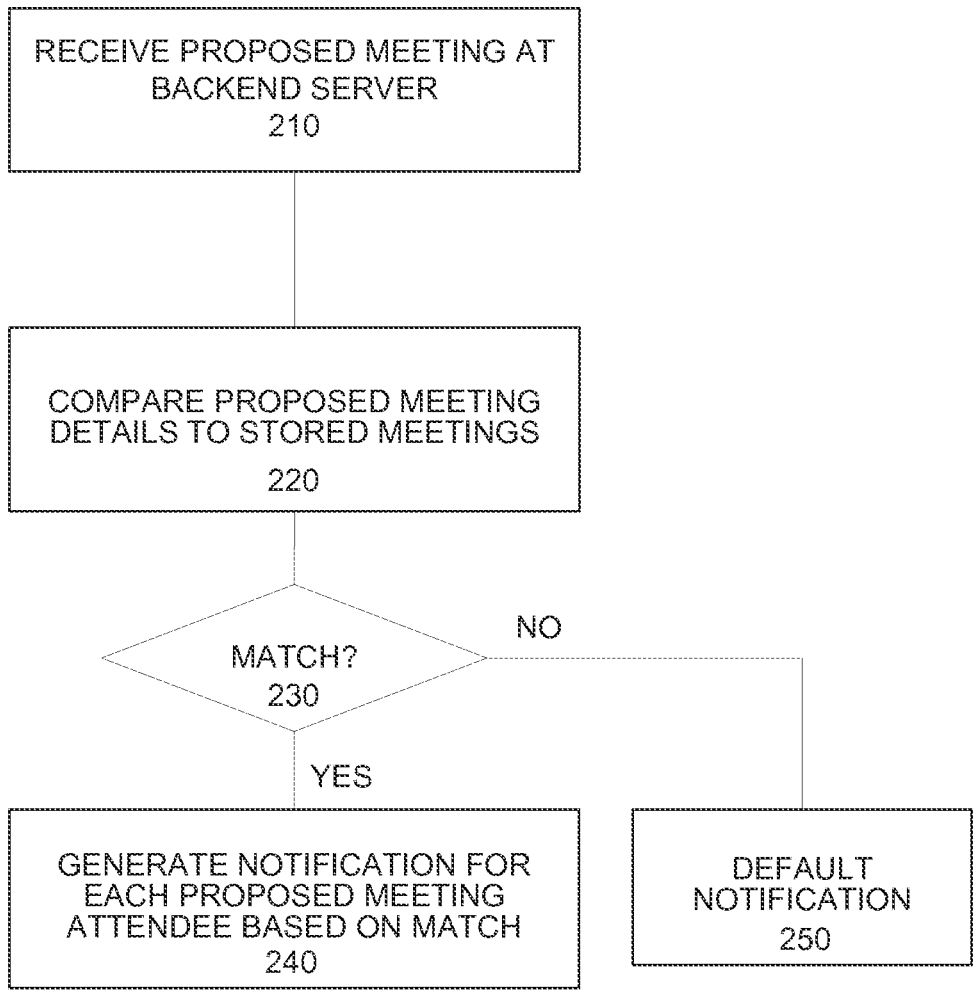
FIG. 3 is a diagram of the process of generating a notification prior to a meeting according to an embodiment.

FIG. 3 illustrates a diagram of the process of generating a notification (reminder) prior to a meeting according to an embodiment. In an embodiment, a meeting creation request for a proposed meeting may be received at a backend server 210. The backend server may compare the details of the proposed meeting to other stored meetings in a database 220. The stored meetings in the database may have been created by processes as discussed above in reference to FIG. 2. The stored meetings may represent previously created and/or concluded meetings and may include details such as, for example, the location of the meeting, the start/end time of the meeting, the attendees of the meeting, and for each attendee the time it took for the attendee to travel to the meeting location. The time it took for each attendee to travel to the meeting location may have been calculated from the movement of the respective mobile device associated/owned by the attendee as discussed above in reference to FIG. 2. If the details of one or more stored meetings match the proposed meeting 230, the backend server may generate a notification for each attendee of the proposed meeting based on the details of the matching stored meetings 240. If not, the backend server may generate a default notification for each attendee of the proposed meeting 250. The generated notification may be transmitted to a device accessible to the attendee such as the attendee's mobile device, computer system, etc.

The time of generation of the notification for each attendee of the proposed meeting may depend on the time it took for the respective attendee to travel to the meeting location in the past as indicated in the stored matching meetings. The travel time of an attendee of a stored meeting may be calculated by 1) subtracting the start time of the motion prior to attending the stored meeting from the end time of the motion as indicated by the attendee's mobile device and/or 2) subtracting the start time of the motion prior to attending the stored meeting from the arrival time at the meeting location as indicated by the attendee's mobile device.

In an embodiment, the time of generation of the notification for an attendee of the proposed meeting may be set to the start time of the proposed meeting minus the average of the prior travel times of the attendee as indicated by the matching stored meetings. For example, the proposed meeting may start at 3 p.m. on a particular day. The average of the prior travel times of the attendee as indicated by the matching stored meetings may be 20 minutes. Therefore the notification may be generated at 2:40 p.m. (3 p.m.-20 minutes). In another embodiment, the time of generation of the notification for an attendee of the proposed meeting may be set to the start time of the proposed meeting minus the prior travel times of the attendee as indicated by the most recently stored matching meeting.

In an embodiment, each attendee of the proposed meeting may specify a meeting preparation time parameter. This value may indicate the amount of time it takes the attendee to prepare for the proposed meeting. In this embodiment, the time of generation of the notification for an attendee of the proposed meeting may be set to the start time of the proposed meeting minus the prior travel time calculated from the matching stored meetings as discussed above minus the specified preparation time. For example, the proposed meeting may start at 3 p.m. on a particular day. The prior travel time of the attendee as indicated by the matching stored meetings may be 20 minutes. The preparation time as specified by the attendee may be 30 minutes. Therefore the notification may be generated at 2:10 p.m. (3 p.m.-20 minutes-30 minutes).

In an embodiment, at step 230, a match may be determined between a proposed meeting and a stored meeting if 1) one or more of the attendees associated with the proposed meeting are the same as one or more attendees of the stored meeting, 2) the location of the proposed meeting is within a predetermined distance from the location of the stored meeting, 3) the title of the proposed meeting is similar to the title of the stored meeting, 4) the start time of the proposed meeting is within a predetermined time interval from the start time of the stored meeting, and/or 5) the end time of the proposed meeting is within a predetermined time interval from the end time of the stored meeting.

In an embodiment, at step 240, prior to generating a notification for an attendee of the proposed meeting, the process may check whether the mobile device of the attendee is outside a predetermined distance from the proposed meeting location. If so, the process may generate the notification as discussed above. Otherwise the notification may not be generated.

In an embodiment, the above discussed processes may be implemented in the context of a carpooling system. Users of a carpool ride usually agree to a proposed pick-up time table and attempt to arrive on time to carpool pick-up locations (similar to an office meeting). The notification methods discussed above may be incorporated into carpooling software to optimally send motion/location based notifications to carpool users.

Although the steps shown in FIG. 2 and FIG. 3 have been described separately, in other embodiments, the steps shown in FIG. 2 and FIG. 3 may be performed by a single device and/or application. For example, a mobile application on a mobile device with access to a calendar application may capture the time period in which the mobile device is in motion prior to a meeting and the mobile device may store the logged motion locally or remotely as discussed in the description of FIG. 2. The same mobile application on the mobile device, in response to receiving a request to create a proposed meeting, may generate notifications for attendees of the proposed meeting based on details of previously stored meetings as discussed in the description of FIG. 3.

The exemplary method and computer program instructions may be embodied on a machine readable storage medium such as a computer disc, optically-readable media, magnetic media, hard drives, RAID storage device, and flash memory. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. When implemented in software, the elements of the invention are programs or the code segments used to perform the necessary tasks. The program or code segments can be stored on machine readable storage media. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the spirit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A computer-implemented method comprising:
receiving a new meeting invitation including a plurality of properties, the plurality of properties being a new meeting location, a plurality of new attendees, a new meeting start time, and a new meeting end time;
searching a database stored on a backend server including past meeting invitations, each of the past meeting invitations including a plurality of properties, the plurality of properties being a past meeting location, a plurality of past attendees, a past meeting start time, and a past meeting end time;
determining whether any of the plurality of properties of the new meeting invitation is identical to a respective one of the plurality of properties of any of the past meeting invitations; and
generating a notification a period of time prior to the new meeting time for each of the plurality of new attendees responsive to a determination that at least one of the plurality of properties of the new meeting invitation is identical to the respective property of one of the past meeting invitations;
wherein:
each of the past meeting invitations is associated with a respective travel time for each of at least one of the past attendees;
for the each of the at least one of the past attendees:
prior to the past meeting start time of the respective past meeting invitation with which the respective travel time is associated, motion of a mobile device of the respective past attendee is detected;
a start time of the detected motion is ascertained and transmitted to the backend server;
an end time of the detected motion, when the mobile device becomes motionless, is ascertained and transmitted to the backend server; and
the backend server ascertains the respective travel time based on the start time of the detected motion and the end time of the detected motion; and
each of at least one of the notifications is to one of the new attendees who is also one of the past attendees, the period of time for the respective notification being set as a function of the travel time for the respective attendee.

2. The method of claim 1, wherein the motion of the mobile device is detected if the motion is above a first predetermined threshold, and motionlessness of the mobile device is determined if the motion is below a second predetermined threshold.

3. The method of claim 1, wherein the period of time is set to an average of travel times of the attendee associated with the past meeting invitations.

4. The method of claim 1, wherein the period of time is further based on a meeting preparation time specified by the attendee.

5. An apparatus comprising:
a processor configured to:
receive a new meeting invitation including a plurality of properties, the plurality of properties including a new meeting location, a plurality of new attendees, a new meeting start time, and a new meeting end time;
search a database stored on a backend server including past meeting invitations, each of the past meeting invitations including a plurality of properties, the plurality of properties including a past meeting location, a plurality of past attendees, a past meeting start time, and a past meeting end time;
determine whether any of the plurality of properties of the new meeting invitation is identical to a respective one of the plurality of properties of any of the past meeting invitations identified by the search; and
generate a notification a period of time prior to the new meeting time for each of the plurality of new attendees responsive to a determination that at least one of the plurality of properties of the new meeting invitation is identical to the respective property of one of the past meeting invitations;
wherein:
each of the past meeting invitations is associated with a respective travel time for each of at least one of the past attendees;
for the each of the at least one of the past attendees:
prior to the past meeting start time of the respective past meeting invitation with which the respective travel time is associated, motion of a mobile device of the respective past attendee is detected;
a start time of the detected motion is ascertained and transmitted to the backend server;
an end time of the detected motion, when the mobile device becomes motionless, is ascertained and transmitted to the backend server; and,
the backend server ascertains the respective travel time based on the start time of the detected motion and the end time of the detected motion; and
each of at least one of the notifications is to one of the new attendees who is also one of the past attendees, the period of time for the respective notification being set as a function of the travel time for the respective attendee.

6. The apparatus of claim 5, wherein the motion of the mobile device is detected if the motion is above a first predetermined threshold, and motionlessness of the mobile device is determined if the motion is below a second predetermined threshold.

7. The apparatus of claim 5, wherein the period of time is set to an average of travel times of the attendee associated with the past meeting invitations.

8. The apparatus of claim 5, wherein the period of time is further based on a meeting preparation time specified by the attendee.

9. A non-transitory computer-readable medium embodied with computer-executable instructions for causing a computer to execute instructions, the computer instructions comprising:
   receiving a new meeting invitation including a plurality of properties, the plurality of properties including a new meeting location, a plurality of new attendees, a new meeting start time, and a new meeting end time;
   searching a database stored on a backend server including past meeting invitations, each of the past meeting invitations including a plurality of properties, the plurality of properties including a past meeting location, a plurality of past attendees, a past meeting start time, and a past meeting end time;
   determining, based on the searching, whether any of the plurality of properties of the new meeting invitation is identical to a respective one of the plurality of properties of any of the past meeting invitations; and
   generating a notification a period of time prior to the new meeting time for each of the plurality of new attendees responsive to a determination that at least one of the plurality of properties of the new meeting invitation is identical to the respective property of one of the past meeting invitations;
   wherein:
      each of the past meeting invitations is associated with a respective travel time for each of at least one of the past attendees;
      for the each of the at least one of the past attendees:
         prior to the past meeting start time of the respective past meeting invitation with which the respective travel time is associated, a motion of a mobile device of the respective past attendee is detected;
         a start time of the detected motion is ascertained and transmitted to the backend server;
         an end time of the detected motion, when the mobile device becomes motionless, is ascertained and transmitted to the backend server; and
         the backend server ascertains the respective travel time based on the start time of the detected motion and the end time of the detected motion; and
      each of at least one of the notifications is to one of the new attendees who is also one of the past attendees, the period of time for the respective notification being set as a function of the travel time for the respective attendee.

10. The non-transitory computer-readable medium of claim 9, wherein the motion of the mobile device is detected if the motion is above a first predetermined threshold, and motionlessness of the mobile device is determined if the motion is below a second predetermined threshold.

11. The non-transitory computer-readable medium of claim 9, wherein the period of time is set to an average of travel times of the attendee associated with the past meeting invitations.

12. The non-transitory computer-readable medium of claim 9, wherein the period of time is further based on a meeting preparation time specified by the attendee.

13. A method computer-implemented on a user's mobile device, wherein the mobile device has a database that includes past meeting invitations that each includes a plurality of properties, the plurality of properties being a past meeting location, a plurality of past attendees, a past meeting start time, and a past meeting end time, the method comprising:
   receiving a new meeting invitation including a plurality of properties, the plurality of properties being a new meeting location, a plurality of new attendees, a new meeting start time, and a new meeting end time;
   determining, by a processor of the mobile device, whether any of the plurality of properties of the new meeting invitation is identical to a respective property of any of the past meeting invitation of the database; and
   generating, by the processor, a notification a period of time prior to the new meeting time for the user responsive to a determination that at least one of the plurality of properties of the new meeting invitation is identical to the respective property of at least one of the past meeting invitations;
   wherein:
      for each of at least one of the past meeting invitations, the method further comprises:
         prior to the past meeting start time of the respective past meeting invitation, detecting, by the mobile device, a motion of the mobile device and ascertaining, by the mobile device, a start time of the detected motion;
         ascertaining, by the mobile device, an end time of the detected motion when the mobile device becomes motionless;
         ascertaining, by the mobile device, a travel time based on the start time of the detected motion and the end time of the detected motion;
         associating, by the mobile device, the ascertained travel time with the respective meeting invitation; and
         the period of time for the notification is determined as a function of the travel time.

14. The method of claim 1, wherein the notification is generated when the new meeting location and the plurality of new attendees are identical to the past meeting location and the plurality of past attendees.

15. The apparatus of claim 5, wherein the notification is generated when the new meeting location and the plurality of new attendees are identical to the past meeting location and the plurality of past attendees.

16. The non-transitory computer-readable medium of claim 9, wherein the notification is generated when the new meeting location and the plurality of new attendees are identical to the past meeting location and the plurality of past attendees.

* * * * *